United States Patent Office 2,732,402
Patented Jan. 24, 1956

2,732,402

N-BENZYL-N-(HYDROXYALKYL) DIHALOACETAMIDES AND THEIR PREPARATION

Alexander R. Surrey, Albany, N. Y., assignor to Sterling Drug Inc., New York, N. Y., a corporation of Delaware No Drawing. Application January 2, 1953,
Serial No. 329,447

28 Claims. (Cl. 260—562)

This invention relates to certain N-(substituted-benzyl)-N-(hydroxyalkyl)dihaloacetamides and to their preparation.

The substituted-dihaloacetamides of my invention have the general formula

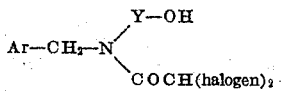

where Ar is a phenyl radical substituted by halo, alkyl, alkoxy, alkylmercapto, alkylsulfonyl or nitro radicals and Y is a lower alpha,beta-alkylene radical or a lower alpha,-gamma-alkylene radical. These substituted-dihaloacetamides exhibit valuable chemotherapeutic properties, for instance, amebacidal activity.

In the above formula, the substituted-phenyl radical designated as Ar means phenyl radicals substituted preferably by from one to three substituents selected from the class consisting of halo, lower alkoxy, lower alkyl, lower alkylmercapto, lower alkylsulfonyl, and nitro. Furthermore, said substituents can be in any of the available positions of the phenyl nucleus, and where more than one, can be the same or different and can be in any of the various position combinations relative to each other. The halo substituents include chloro, bromo, iodo and fluoro. The lower alkoxy, lower alkyl, lower alkylmercapto and lower alkylsulfonyl substituents have preferably one to six carbon atoms, including such substituents as: methoxy, ethoxy, methylenedioxy, ethylenedioxy, n-propoxy, isopropoxy, isobutoxy, n-amoxy, n-hexoxy and the like for lower alkoxy; methyl, ethyl, n-propyl, iso-propyl, n-butyl, isobutyl, 2-butyl, n-amyl, n-hexyl and the like for lower alkyl; methylmercapto, ethylmercapto, n-propylmercapto, isobutylmercapto, n-hexylmercapto and the like for lower alkylmercapto; and methylsulfonyl, ethylsulfonyl, n-propylsulfonyl, isobutylsulfonyl, n-hexylsulfonyl and the like for lower alkylsulfonyl.

Y when a lower alpha,beta-alkylene radical has preferably from two to six carbon atoms and has its two free valence bonds on adjacent carbon atoms, including such examples as

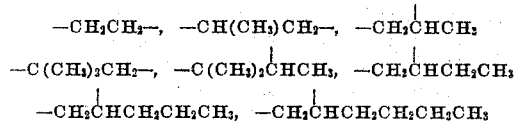

and the like; and when a lower alpha,gamma-alkylene radical Y has preferably from three to six carbon atoms and has its two free valence bonds on carbon atoms separated by a third carbon atom, including such examples as

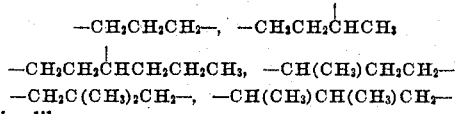

and the like.

The halogen atoms of the dihaloacetyl radical of my compounds, designated in the above formula as —COCH-(halogen)$_2$, can be chloro, bromo, iodo or fluoro, such dihaloacetyl radicals including dichloroacetyl, dibromoacetyl, diiodoacetyl, difluoroacetyl, bromochloroacetyl, and the like.

The compounds of my invention were prepared by treating a substituted-benzylaminoalkanol of the formula Ar—CH$_2$—NH—Y—OH with a dihaloacetylating agent selected from the class consisting of a lower alkyl dihaloacetate and a dihaloacetyl halide, where Ar and Y have the meanings given above. When a lower alkyl dihaloacetate was used, the methyl esters were preferred because of their ease of preparation and ready availability, however, other lower alkyl esters such as the ethyl, n-propyl, isobutyl, 2-amyl and n-hexyl esters are satisfactory for the purpose. When a dihaloacetyl halide was used, the halide halogen, i. e., the halo radical attached to the carbonyl function, was preferably chloro; however, the other halo radicals, i. e., bromo, iodo, fluoro, also can be used. Illustrations of the process of my invention are: the preparation of N-(2,4-dichlorobenzyl) - N - (2-hydroxyethyl)dichloroacetamide by treating 2-(2,4-dichlorobenzylamino)-ethanol with methyl dichloroacetate; the preparation of N-(3,4,5-triethoxybenzyl)-N-(2-hydroxypropyl)dibromoacetamide by treating 1-(3,4,5-triethoxybenzylamino) - 2 - propanol with dibromoacetyl bromide; the preparation of N-(4-nitrobenzyl) - N - (2-hydroxyethyl)difluoroacetamide by treating 2-(4-nitrobenzylamino)ethanol with methyl difluoroacetate. When a lower alkyl dihaloacetate was used the reaction was facilitated by warming the reactants together on a steam bath. When a dihaloacetyl halide was used the reaction was carried out preferably below room temperature, with chilling if necessary.

The intermediate substituted-benzylaminoalkanols of the above given formula were prepared by treating a substituted-benzaldehyde of the formula ArCHO with an alkanolamine of the formula H$_2$N—Y—OH. The anil, ArCH=N—Y—OH, which was probably formed, was then catalytically reduced directly without isolation to yield the substituted-aminoalkanol, ArCH$_2$NH—Y—OH. Alternatively, these intermediate substituted-aminoalkanols were prepared by treating a substituted-benzyl halide, ArCH$_2$-halogen, with an ethanolamine, H$_2$N—Y—OH. Illustrations of the preparation of the intermediate substituted-benzylaminoalkanols are: the preparation of 2-(3,4,5-tribromobenzylamino)ethanol by treating 3,4,5-tribromobenzaldehyde with ethanolamine to form the anil which is then catalytically reduced; the formation of 1-(4-n-butoxybenylamino)-2-propanol by treating 4-n-butoxybenzyl chloride with 2-hydroxypropylamine.

The following examples will further illustrate specific embodiments of the invention.

EXAMPLE 1

A. Substituted-benzylaminoalkanols

As pointed out above these intermediate compounds were prepared by one of two procedures, namely: the reaction of a substituted-benzaldehyde with an alkanolamine and catalytic reduction of the resulting anil; and the reaction of a substituted-benzyl halide with an alkanolamine. Illustrations of these procedures follow.

*2-(4-isopropylbenzylamino) ethanol.*—A mixture of 44.3 g. of 4-isopropylbenzaldehyde and 18.3 g. of ethanolamine was heated on a steam bath in vacuo for one hour. The mixture was dissolved in 125 ml. of hot ethanol and reduced catalytically with 0.5 g. of palladium chloride and 3.5 g. of charcoal at about two atmospheres of hydrogen. After the reduction had been completed, the catalyst was filtered off and the alcohol distilled under reduced pressure. The residue which solidified was recrystallized once from n-heptane (43 g.) and once from ether, yielding the product, 2-(4-isopropylbenzylamino) ethanol, M. P. 80.9–83.3° C. (corr.).

*Analysis.*—Calcd. for $C_{12}H_{19}NO$: C, 74.55; H, 10.12. Found: C, 74.53; H, 10.16.

2 - (4 - isopropylbenzylamino) ethanol hydrochloride melted at 129.4–132.2° C. (corr.) when recrystallized from ethanol-ether.

*Analysis.*—Calcd. for $C_{12}H_{19}NO \cdot HCl$: C, 62.74; H, 8.77; Cl, 15.44. Found: C, 63.00; H, 8.99; Cl, 15.62.

2-(4-methoxybenzylamino) ethanol.—This preparation was carried out following the procedure described for preparing 2-(4-isopropylbenzylamino)-ethanol but using 41 g. of 4-methoxybenzaldehyde and 18 g. of ethanolamine. After separation from the catalyst and removal of the ethanol, the residue was fractionally distilled at 139°C. at 0.6 mm., $n_D^{25}$, 1.5431. The material was converted to its hydrochloride salt and then back to the base. This product, 2-(4-methoxybenzylamino) ethanol, was obtained as a solid which on recrystallization from n-hexane, melted at 38–39° C. (corr.).

*Analysis.*—Calcd. for $C_{10}H_{15}NO_2$: C, 66.28; H, 8.28. Found: C, 66.66; H, 8.74.

2 - (4 - methoxybenzylamino) ethanol hydrochloride melted at 112.2–113.6° C. (corr.), recrystallized from isopropanol-ether.

*Analysis.*—Calcd. for $C_{10}H_{15}NO_2 \cdot HCl$: C, 55.15; H, 7.41; Cl, 16.29. Found: C, 55.45; H, 7.61; Cl, 16.10.

Other substituted-benzylaminoalkanols prepared by the above illustrated procedure are given as follows. These basic compounds were recrystallized from n-heptane or ether and their hydrochloride salts were usually recrystallized from ethanol-ether, isopropanol-ether, isopropanol or acetone.

2 - (4 - isopropoxybenzylamino)ethanol, M. P. 75.0–76.6° C. (corr.). *Analysis.*—Calcd. for $C_{12}H_{19}NO_2$: C, 68.86; H, 9.15. Found: C, 69.84; H, 9.27. 2-(4-isopropoxybenzylamino)ethanol hydrochloride, M. P. 134.9–135.4° C. (corr.). *Analysis.*—Calcd. for

$C_{12}H_{19}NO_2 \cdot HCl$:

C, 58.65; H, 8.21; Cl, 14.43. Found: C, 58.60; H, 7.95; Cl, 14.35.

2-(4-ethoxybenzylamino)ethanol, M. P. 63.0–63.6° C. (corr.). *Analysis.*—Calcd. for $C_{11}H_{17}NO_2$: C, 67.67; H, 8.78. Found: C, 67.90; H, 9.09. 2-(4-ethoxybenzylamino)ethanol hydrochloride, M. P. 103–104.6° C. (corr.). *Analysis.*—Calcd. for $C_{11}H_{17}NO_2 \cdot HCl$: C, 57.01; H, 7.83; Cl, 15.30. Found: C, 57.00; H, 7.81; Cl, 15.07.

2-(4-n-propoxybenzylamino)ethanol, M. P. 67–68.2° C. (corr.) *Analysis.*—Calcd. for $C_{12}H_{19}NO_2$: C, 68.86; H, 9.15. Found: C, 68.75; H, 9.12. 2-(4-n-propoxybenzylamino)ethanol hydrochloride, M. P. 134.2–138.2° C. (corr.). *Analysis.*—Calcd. for $C_{12}H_{19}NO_2 \cdot HCl$: C, 58.65; H, 8.21; Cl, 14.43. Found: C, 58.67; H, 8.31; Cl, 14.40.

2-(4-n-amoxybenzylamino)ethanol, M. P. 51.9–55° C. (corr.). *Analysis.*—Calcd. for $C_{14}H_{23}NO_2$: C, 70.86; H, 9.77. Found: C, 70.44; H, 9.72. 2-(4-n-amoxybenzylamino)ethanol hydrochloride, M. P. 144–145° C. (corr.). *Analysis.*—Calcd. for $C_{14}H_{23}NO_2 \cdot HCl$: C, 61.40; H, 8.83; Cl 12.95. Found: C, 61.43; H, 8.71; Cl, 12.70.

2 - (3,4 - methylenedioxybenzylamino)ethanol, M. P. 62.6–64.4° C. (corr.). *Analysis.*—Calcd. for $C_{10}H_{13}NO_3$: C, 61.53; H, 6.72. Found: C, 61.60; H, 7.03. 2-(3,4-methylenedioxybenzylamino)ethanol hydrochloride, M. P. 152–152.6° C. (corr.). *Analysis.*—Calcd. for

$C_{10}H_{13}NO_3 \cdot HCl$:

C, 51.85; H, 6.09; N, 15.30. Found: C, 51.60; H, 6.08; N, 15.13.

2-(4-n-butoxybenzylamino)ethanol hydrochloride, M. P. 146.6–147.5° C. (corr.). *Analysis.*—Calcd. for $C_{13}H_{21}NO_2 \cdot HCl$: C, 60.11; H, 8.47; Cl, 13.65. Found: C, 60.28; H, 8.38; Cl, 13.62.

The following substituted-benzylaminoalkanols were prepared by the reaction of a substituted-benzyl halide with an alkanol amine.

2-(2,4-dichlorobenzylamino)ethanol.—78.2 g. of 2,4-dichlorobenzyl chloride was added dropwise with stirring to 80 g. of ethanolamine. After standing at room temperature overnight, the mixture was basified with 20% sodium hydroxide solution and extracted with ether. Removal of the ether and recrystallization of the residue with n-heptane gave 56 g. of 2-(2,4-dichlorobenzylamino)-ethanol, melting at 62–62.8° C. (corr.).

*Analysis.*—Calcd. for $C_9H_{11}Cl_2NO$; Cl, 32.22. Found: Cl, 32.43.

Alternatively, this product was obtained directly in solid form by pouring the reaction mixture into a large volume of water and stirring.

2 - (2,4 - dichlorobenzylamino)ethanol hydrochloride melted at 184.7–186.7° C. (corr.). *Analysis.*—Calcd. for $C_9H_{11}Cl_2NO \cdot HCl$: C, 42.12; H, 4.70; Cl, 13.80. Found: C, 42.30; H, 4.66; Cl, 13.78.

Other substituted-benzylaminoalkanols prepared by the above illustrated procedure for the preparation of 2-(2,4-dichlorobenzylamino)ethanol are given in the following paragraphs.

2-(3,4-dichlorobenzylamino)ethanol hydrochloride, M. P. 145.9–148.1° C. (corr.). *Analysis.*—Calcd. for $C_9H_{11}Cl_2NO \cdot HCl$: C, 42.13; H, 4.71; Cl, 13.82. Found: C, 42.26; H, 4.54; Cl, 13.93.

2-(2-chlorobenzylamino)ethanol hydrochloride, M. P. 135.2–136.9° C. (corr.). *Analysis.*—Calcd. for

$C_9H_{12}ClNO \cdot HCl$:

C, 48.68; H, 5.90; Cl, 15.97. Found: C, 48.56; H, 6.07; Cl, 15.76.

2-(chlorobenzylamino)ethanol, distilled at 126–131° C. at 0.7 mm.; $n_D^{25}$, 1.5470. 2-(4-chlorobenzylamino)ethanol hydrochloride, M. P. 172.7–173.8° C. (corr.). *Analysis.*—Calcd. for $C_9H_{12}ClNO \cdot HCl$: N, 6.30; Cl, 31.93. Found: N, 6.23; Cl, 31.96.

3-(2,4-dichlorobenzylamino)propanol was prepared as above by adding dropwise with stirring over a period of one hour 30 g. of 2,4-dichlorobenzyl chloride to 35 g. of 3-hydroxypropylamine. Stirring was continued for two hours after the addition and the resulting mixture was made strongly alkaline with 56% aqueous potassium hydroxide solution and extracted with ethylene dichloride. The solvent was removed after drying and the residue distilled at 150–155° C. at 0.5 mm.; $n_D^{25}$, 1.5600. Yield: 23 g.

*Analysis.*—Calcd. for $C_{10}H_{13}Cl_2NO$: N, 5.98. Found: N, 6.00.

3-(3,4-dichlorobenzylamino)propanol was prepared according to the procedure given in the immediately preceding paragraph but using 60 g. of 3,4-dichlorobenzyl chloride and 70 g. of 3-hydroxypropylamine. This intermediate product distilled at 165–172° C. at 0.6–0.8 mm.; $n_D^{25}$, 1.5590. Yield: 64 g.

*Analysis.*—Calcd. for $C_{10}H_{13}Cl_2NO$: N, 5.98. Found: N, 5.96.

When the procedure described above for the preparation of 3-(2,4-dichlorobenzylamino)propanol was followed but using 2-hydroxypropylamine in place of 3-hydroxypropylamine, the resulting product was 1-(2,4-dichlorobenzylamino)-2-propanol. This product in the form of its hydrochloride salt melted at 152.4–154.2° C. (corr.).

*Analysis.*—Calcd. for $C_{10}H_{13}Cl_2NO \cdot HCl$: C, 46.42; H, 5.66; Cl⁻, 12.46. Found: C, 46.14; H, 5.97; Cl⁻, 12.44.

Other substituted-benzylamino-alkanols can be prepared according to the procedures given above using the appropriate substituted-benzaldehyde or substituted-benzyl halide and alkanolamine; such compounds include 2-(4-dibromobenzylamino)ethanol, 2-(3,4-diiodobenzylamino)ethanol, 2,(4-fluorobenzylamino)ethanol, 2-(3,4,5-trichlorobenzylamino)ethanol, 2-(4-bromo-2-chlorobenzylamino)ethanol, 2-(2,4-difluorobenzylamino)ethanol, 2-(4-n-hexoxybenzylamino)ethanol, 2-(4-isobutoxybenzylamino)ethanol, 2-(3,4,5-trimethoxybenzylamino) ethanol, 2-(4-isobutylbenzylamino)ethanol, 2-(4-n-amylbenzylamino)ethanol, 2-(4-n-hexybenzylamino)ethanol, 2-(4-nitrobenzylamino)ethanol, 1-(4-nitrobenzylamino)-2-propanol, 3-(4-nitrobenzylamino)propanol, 2-(4-n-butylmercaptobenzylamino)ethanol, 2-(4-isobutylsulfonylbenzylamino)ethanol, 1-(4-n-butylbenzylamino)-2-propanol, 1-(3,4-dichlorobenzylamino)-2-butanol, 3-(4-isopropylbenzylamino)-propanol, and the like.

B. *N-(3,4-dichlorobenzyl)-N-(2-hydroxyethyl)dichloroacetamide*

A solution of 4 g. of dichloroacetyl chloride in 30 ml. of ethylene dichloride was added dropwise with stirring and cooling to a solution of 12 g. of 2-(3,4-dichlorobenzylamino)ethanol in 100 ml. of ethylene dichloride. The temperature was maintained at 0° to −5° C. by cooling with an ice-salt bath. After the addition had been completed, the reaction mixture was allowed to warm up to room temperature with stirring. The 2-(3,4-dichlorobenzylamino)ethanol hydrochloride which separated was removed by filtration and the filtrate was washed with 1 N hydrochloric acid, then water, and dried over anhydrous calcium sulfate. After distilling the ethylene dichloride under reduced pressure, the residue was triturated with ether to give 5.5 g. of the product, N-(3,4-dichlorobenzyl)-N-(2-hydroxyethyl)dichloroacetamide, M. P. 99.4–101.5° C. (corr.) when recrystallized from a benzene-n-pentane mixture.

*Analysis.*—Calcd. for $C_{11}H_{11}Cl_4NO_2$: Cl, 42.84; C, 39.89; H, 3.35. Found: Cl, 42.68; C, 39.70; H, 3.65.

N - (3,4 - dichlorobenzyl) - N - (2 - hydroxyethyl)dichloroacetamide was found to have amebacidal activity, being effective against amebiasis (*Endamoeba criceti*) of hamsters.

When the above procedure is followed but using diiodoacetyl chloride, difluoroacetyl fluoride or bromochloroacetyl chloride, in place of dichloroacetyl chloride, the following respective compounds result: N-(3,4-dichlorobenzyl)-N-(2-hydroxyethyl)diiodoacetamide, N-(3,4-dichlorobenzyl)-N-(2-hydroxyethyl)difluoroacetamide or N-(3,4 - dichlorobenzyl) - N - (2 - hydroxyethyl)bromochloroacetamide.

EXAMPLE 2

*N-(2,4-dichlorobenzyl)-N-(2-hydroxyethyl)dichloro acetamide*

A solution of 7.3 g. of dichloroacetyl chloride in 30 ml. of ethylene dichloride was added dropwise with stirring to 22 g. of 2-(2,4-dichlorobenzylamino)ethanol in 300 ml. of ethylene dichloride. The temperature was maintained below 24° C. by external cooling. Stirring was continued for an hour and the hydrochloride of the starting amine which separated was filtered off, yielding 13.5 g. The filtrate was washed with dilute hydrochloric acid and then water and dried. Removal of the solvent gave an oil which solidified on stirring with ether. After recrystallization from benzene and then ethylene dichloride, the product, N-(2,4-dichlorobenzyl)-N-(2-hydroxyethyl)dichloroacetamide, melted at 112.4–113.4° C. (corr.).

*Analysis.* —Calcd. for $C_{11}H_{11}Cl_4NO_2$: Cl, 42.84; C, 39.89; H, 3.35. Found: Cl, 42.95; C, 40.20; H, 3.70.

N - (2,4 - dichlorobenzyl) - N - (2 - hydroxyethyl)dichloroacetamide was found to have amebacidal activity, being effective against amebiasis (*Endamoeba criceti*) of hamsters.

Other N - (halogenated-benzyl) - N-(2-hydroxyethyl)-dichloroacetamides can be prepared according to the procedure given above but using other 2-(halogenated-benzylamino)ethanols in place of 2-(2,4-dichlorobenzylamino)ethanol. Thus using 2-(2,4-dibromobenzylamino)ethanol, 2-(3,4-diiodobenzylamino)ethanol, 2-(4-fluorobenzylamino)ethanol, 2-(3,4,5-trichlorobenzylamino)ethanol, 2 - (4 - bromo - 2-chlorobenzylamino)-ethanol or 2 - (2,4 - difluorobenzylamino)ethanol, there is obtained N - (2,4 - dibromobenzyl) - N - (2 - hydroxyethyl)dichloroacetamide, N - (3,4 - diiodobenzyl) - N-(2 - hydroxyethyl)dichloroacetamide, N - (4 - fluorobenzyl) - N - (2 - hydroxyethyl)dichloroacetamide, N-(3,4,5 - trichlorobenzyl) - N - (2 - hydroxyethyl)dichloroacetamide, N - (4 - bromo - 2 - chlorobenzyl) - N - (2-hydroxyethyl)dichloroacetamide or N - (2,4 - difluorobenzyl)-N-(2-hydroxyethyl)dichloroacetamide.

Other N - (substituted - benzyl) - N - (2 - hydroxyethyl)dichloroacetamides can be prepared according to the procedure given above but using other 2-(substituted-benzylamino)ethanols in place of 2-(2,4-dichlorobenzylamino)ethanol. Thus, using 2-(4-n-butylmercaptobenzylamino)ethanol or 2-(4-n-isobutylsulfonylbenzylamino)ethanol, there is obtained N-(4-n-butylmercaptobenzyl)-N-(2-hydroxyethyl)dichloroacetamide or N-(4-isobutylsulfonylbenzyl) - N - (2 - hydroxyethyl)dichloroacetamide, respectively.

EXAMPLE 3

*N-(4-chlorobenzyl)-N-(2-hydroxyethyl) dichloroacetamide*

When the procedure described in Example 2 is followed but using 27 g. of 2-(4-chlorobenzylamino)ethanol in 500 ml. of ethylene dichloride and 10.7 g. of dichloroacetyl chloride at about 10° C., 13 g. of N-(4-chlorobenzyl)-N-(2-hydroxyethyl)dichloroacetamide was obtained. After recrystalization from an ether-n-pentane mixture, the product melted at 94.4–97.2° C. (corr.).

*Analysis.*—Calcd. for $C_{11}H_{12}Cl_3NO_2$: Cl, 35.87; C, 44.54; H, 4.07. Found: Cl, 35.82; C, 44.63; H, 4.30.

N - (4 - chlorobenzyl) - N - (2 - hydoxyethyl)dichloroacetamide was found to have amebacidal activity, being effective against amebiasis (*Endamoeba criceti*) of hamsters.

Other N - (halobenzyl) - N - (2 - hydroxyethyl)dichloroacetamides can be prepared according to the procedure given above but using other 2-(halobenzylamino)-ethanols in place of 2-(4-chlorobenzylamino)ethanol. Thus, using 2-(4-bromobenzylamino)ethanol, 2-(4-iodobenzylamino)ethanol, 2-(4-fluorobenzylamino)ethanol or 2-(3-chlorobenzylamino)ethanol, there is obtained respectively N - (4 - bromobenzyl) - N - (2 - hydroxyethyl)dichloroacetamide, N - (4 - iodobenzyl) - N - (2-hydroxyethyl)dichloroacetamide, N - (4 - fluorobenzyl)-N-(2-hydroxyethyl)dichloroacetamide or N-(3-chlorobenzyl)-N-(2-hydroxyethyl)dichloroacetamide.

EXAMPLE 4

*N-(4-ethoxybenzyl)-N-(2-hydroxyethyl)-dichloroacetamide*

A mixture of 7 g. of 2-(4-ethoxybenzylamino)ethanol and 5.7 g. of methyl dichloroacetate was heated at 60–70° C. for five hours and then poured with stirring into 100 ml. of 1 N hydrochloric acid. The product, which solidified, was filtered off and air dried; yield 9 g. After recrystallization from benzene-n-pentane and then from ether-n-pentane the N-(4-ethoxybenzyl)-N-(2-hydroxyethyl)dichloroacetamide melted at 76.9–79.1° C. (corr.).

*Analysis.*—Calcd. for $C_{13}H_{17}Cl_2NO_3$: Cl, 23.16; C, 50.99; H, 5.60. Found: Cl, 23.18; C, 51.26; H, 5.66.

N - (4 - ethoxybenzyl) - N - (2 - hydroxyethyl)dichloroacetamide was found to have amebacidal activity, being effective against amebiasis (*Endamoeba criceti*) of hamsters.

Following the above procedure but using methyl diiodoacetate, ethyl dibromoacetate or n-butyl difluoroacetate in place of methyl dichloroacetate, the following respective products are obtained: N-(4-ethoxybenzyl)-N - (2 - hydroxyethyl)-diiodoacetamide, N - (4 - ethoxybenzyl)-N-(2-hydroxyethyl)dibromoacetamide or N-(4-ethoxybenzyl)-N-(2-hydroxyethyl)difluoroacetamide.

EXAMPLE 5

*N-(2-hydroxyethyl)-N-(4-isopropylbenzyl)-dichloroacetamide*

To a solution of 43 g. of 2-(4-isopropylbenzylamino)-ethanol in 850 ml. of ethylene dichloride was added at 0° C. with stirring a solution of 16.3 g. of dichloroacetyl chloride in 40 ml. of ethylene dichloride. After the addition, stirring was continued for one hour and the mixture was allowed to stand overnight at room temperature, then washed with water, dilute hydrochloric acid and again with water. After drying, the solvent was removed by distillation to give 16 g. of N-(2-hydroxyethyl) - N - (4 - isopropylbenzyl)dichloroacetamide. After recrystallization from ether-n-pentane and then n-heptane, the product melted at 84.5–85.5° C. (corr.).

*Analysis.*—Calcd. for $C_{14}H_{19}Cl_2NO_2$: Cl, 23.31; C, 55.27; H, 6.30. Found: Cl, 23.07; C, 55.17; H, 6.49.

N - (2 - hydroxyethyl) - N - (4 - isopropylbenzyl)-dichloroacetamide was found to have amebacidal activity, being effective against amebiasis (*Endamoeba criceti*) of hamsters.

Other N - (alkylated - benzyl) - N - (2 - hydroxyethyl)dichloroacetamides can be prepared according to the procedure given above but using other 2-(alkylated-benzylamino)ethanols in place of 2-(4-isopropylbenzylamino)ethanol. Thus, using 2-(2-ethylbenzylamino)-ethanol, 2-(3-n-butylbenzylamino)ethanol, 2-(4-isobutylbenzylamino)ethanol, 2-(4-n-hexylbenzylamino)ethanol, 2-(3,4-diethylbenzylamino)ethanol or 2-(3,4,5-trimethylbenzylamino)ethanol, there is obtained respectively N-(2 - ethylbenzyl) - N - (2 - hydroxyethyl)dichloroacetamide, N - (3 - n - butylbenzyl) - N - (2 - hydroxyethyl)dichloroacetamide, N - (2 - hydroxyethyl) - N-(4 - isobutylbenzyl)dichloroacetamide, N - (4 - n - hexylbenzyl) - N - (2 - hydroxyethyl)dichloroacetamide, N-(3,4 - diethylbenzyl) - N - (2 - hydroxyethyl)dichloroacetamide or N-(2-hydroxyethyl)-N-(3,4,5-trimethylbenzyl)dichloroacetamide.

EXAMPLE 6

*N-(2-hydroxyethyl)-N-(3,4-methylenedioxybenzyl)-dichloroacetamide*

To a solution of 46 g. of 2(3,4-methylenedioxybenzylamino)ethanol in 800 ml. of ethylene dichloride was added 17.6 g. of dichloroacetyl chloride in 40 ml. of ethylene dichloride. After the addition, stirring was continued for one hour and the mixture was allowed to stand overnight at room temperature, then washed with water, dilute hydrochloric acid and again with water. After drying, the solvent was removed by distillation to give 14 g. of N-(2-hydroxyethyl)-N-(3,4-methylenedioxybenzyl)dichloroacetamide. After recrystallization from ether-n-pentane and then ether, the product melted at 101.9–103.4° C. (corr.).

*Analysis.*—Calcd. for $C_{12}H_{13}Cl_2NO_4$: Cl, 23.17; C, 47.08; H, 4.28. Found: Cl, 22.89; C, 47.09; H, 4.39.

N - (2 - hydroxyethyl) - N - (3,4 - methylenedioxybenzyl)dichloroacetamide was found to have amebacidal activity, being effective against amebiasis (*Endamoeba criceti*) of hamsters.

EXAMPLE 7

*N-(2-hydroxyethyl)-N-(4-nitrobenzyl)dichloroacetamide*

16 g. of 2-(4-nitrobenzylamino)ethanol was dissolved in 150 ml. of ethylene dichloride by warming to 35° C. The solution was cooled with stirring to 25° C. and 6 g. of dichloroacetyl chloride in 20 ml. of ethylene dichloride was added dropwise. The temperature rose to 35° C. and the solid began to separate. The mixture was stirred for ninety minutes and filtered. The solid was stirred in water to give 5 g. of insoluble material melting at 127–131° C. After recrystallization from ethanol, the product, N - (2 - hydroxyethyl) - N - (4 - nitrobenzyl)dichloroacetamide, melted at 132.2–133.6° C. (corr.).

*Analysis.*—Calcd. for $C_{11}H_{12}Cl_2N_2O_4$: Cl, 23.09; C, 43.02; H, 3.94. Found: Cl, 23.01; C, 43.22; H, 4.15.

N - (2 - hydroxyethyl) - N - (4 - nitrobenzyl)dichloroacetamide was found to have amebacidal activity, being effective against amebiasis (*Endamoeba criceti*) of hamsters.

Following the above procedure but using 1-(4-nitrobenzylamino)-2-propanol, 3-(4-nitrobenzylamino)propanol, 1 - (2,4 - dichlorobenzylamino) - 2 - propanol, 1-(4-n-butylbenzylamino)-2-propanol, 1-(3,4-dichlorobenzylamino) - 2 - butanol, 1 - (2,4 - dichlorobenzylamino)-2 - hexanol and 3 - (4 - isopropylbenzylamino) - propanol in place of 2-(4-nitrobenzylamino)ethanol, the following respective products are obtained: N-(2-hydroxypropyl - N - (4 - nitrobenzyl)dichloroacetamide, N - (3 - hydroxypropyl) - N - (4 - nitrobenzyl)dichloroacetamide, N - 2,4 - dichlorobenzyl) - N - (2 - hydroxypropyl)dichloroacetamide, N - (4 - n - butylbenzyl) - N - (2 - hydroxypropyl) - dichloroacetamide, N - (3,4 - dichlorobenzyl) - N - (2 - hydroxybutyl)dichloroacetamide, N - (2,4 - dichlorobenzyl) - N - (2 - hydroxyhexyl)dichloroacetamide and N - (3 - hydroxypropyl) - N - (4 - isopropylbenzyl)dichloroacetamide.

When the procedure of Example 7 is followed but using dibromoacetyl bromide, diiodoacetyl iodide, difluoroacetyl fluoride or bromochloroacetyl chloride in place of dichloroacetyl chloride, the following respective compounds are obtained: N - (2 - hydroxyethyl) - N - (4 - nitrobenzyl)dibromoacetamide, N - (2 - hydroxyethyl) - N - (4 - nitrobenzyl)diiodoacetamide, N - (2 - hydroxyethyl) - N - (4 - nitrobenzyl)difluoroacetamide or N - (2 - hydroxyethyl) - N - (4 - nitrobenzyl)bromochloroacetamide.

EXAMPLE 8

*N - (4 - n - butoxybenzyl) - N - (2 - hydroxyethyl)dichloroacetamide*

A solution of 4.63 g. of dichloroacetyl chloride in 20 ml. of ethylene dichloride was added dropwise with stirring and cooling (0–5° C.) to a solution of 14 g. of 2-(4-n-butoxybenzylamino) ethanol in 100 ml. of ethylene dichloride. After the addition had been completed, the reaction mixture was allowed to stand overnight at room temperature and ether was added to precipitate 8 g. of 2-(4-n-butoxybenzylamino) ethanol hydrochloride. The solid was filtered off and the filtrate was washed with 1 N hydrochloric acid and then water. After drying over anhydrous calcium sulfate, the solvents were removed by distillation. The residue was dissolved in ether, filtered with charcoal and n-pentane was added to incipient turbidity; yield 5 g., M.P. 81–85°C. Recrystallization from ether-n-pentane gave the product, N-(4-n-butoxybenzyl)-N - (2 - hydroxyethyl)dichloroacetamide, melting at 88–88° C. (corr.).

*Analysis.*—Calcd. for $C_{15}H_{21}Cl_2NO_3$: Cl, 21.22; C, 53.90; H, 6.33. Found: Cl, 21.47; C, 53.57; H, 6.44.

N-(4 - n - butoxybenzyl)-N-(2-hydroxyethyl) dichloroacetamide was found to have amebacidal activity, being effective against amebiasis (*Endamoeba criceti*) of hamsters.

When the above procedure is followed but using 2-(4-ethoxybenzylamino)ethanol, 2 - (4-n-propoxybenzylamino)ethanol, 2 - (4 - - isopropoxybenzylamino)-ethanol, 2-(4-isobutoxybenzylamino)ethanol, 2 - (4-n-amoxybenzylamino)ethanol, 2-(4-n-hexoybenzylamino)ethanol or 2-(3,4,5-trimethoxybenzylamino)ethanol in place of 2-(4-n-butoxybenzylamino)ethanol, the following products are obtained: N - (4 - ethoxybenzyl)-N-(2-hydroxyethyl)dichloroacetamide, N - (2-hydroxyethyl)-N-(4-n-propoxybenzyl)dichloroacetamide, N-(2hydroxyethyl)-N-(4-isopropoxybenzyl)-dichloroacetamide, N-(2-hydroxyethyl)-

N-(4-isobutoxybenzyl)dichloroacetamide, N-(4-n-amoxybenzyl)-N-(2-hydroxyethyl)dichloroacetamide, N - (4-n-hexoxybenzyl)-N-(2-hydroxyethyl)dichloroacetamide or N - (3,4,5-trimethoxybenzyl)-N-(2-hydroxyethyl)dichloroacetamide.

EXAMPLE 9

N - (2,4 - dichlorobenzyl)-N-(2 - hydroxyethyl)dibromoacetamide

A mixture of 5.5 g. of 2-(2,-dichlorobenzylamino)ethanol and 7 g. of ethyl dibromoacetate was heated at 60° C. for three hours. The mixture, which thickened, was stirred in dilute hydrochloric acid and the product was extracted with chloroform. The chloroform solution was washed with water and dried. After removing the chloroform by distillation, the residue was recrystallized from ethylene dichloride and a small amount of n-hexane to give 3.5 g. of the product, N-(2,4-dichlorobenzyl)-N-(2-hydroxyethyl)dibromoacetamide, melting at 115.0–117.2°C. (corr.).

Analysis.—Calcd. for $C_{11}H_{11}Cl_2Br_2NO_2$: Br, 38.07; C, 31.46; H, 2.64. Found: Br, 37.75; C, 31.43; H, 2.85.

N - (2,4-dichlorobenzyl)-N-(2-hydroxyethyl)dibromoacetamide was found to have amebacidal activity, being effective against amebiasis (*Endamoeba criceti*) of hamsters.

EXAMPLE 10

N - (2,4 - dichlorobenzyl)-N-(2-hydroxypropyl)dichloroacetamide

A mixture of 17.5 g. of 1-(2,4-dichlorobenzylamino)-2-propanol and 11.5 g. of methyl dichloroacetate was heated with stirring at 60–70°C. for four hours. After stirring the resulting mixture with 1 N hydrochloric acid, the product was collected and washed with water; yield 18 g. After two recrystallizations from ethylene dichloride, the product, N-(2,4 - dichlorobenzyl) - N - (2 - hydroxypropyl)dichloroacetamide, melted at 135.1–138° C. (corr.).

Analysis.—Calcd. for $C_{12}H_{13}Cl_4NO_2$: Cl, 41.10; C, 41.77; H, 3.80. Found: Cl, 40.66; C, 41.56; H, 3.97.

N - (2,4-dichlorobenzyl)-N-(2-hydroxypropyl)dichloroacetamide was found to have amebacidal activity, being effective against amebiasis (*Endamoeba criceti*) of hamsters.

EXAMPLE 11

N - (3,4-dichlorobenzyl)-N-(2-hydroxypropyl)dichloroacetamide

A mixture of 17.5 g. of 1-(3,4-dichlorobenzylamino)-2-propanol and 11.9 g. of methyl dichloroacetate was heated at 60°C. for four hours. After stirring the resulting mixture with 1 N hydrochloric acid, the product was collected and washed with water; yield 8 g. After two recrystallizations from ethylene dichloride, the product, N-(3,4-dichlorobenzyl)-N-(2-hydroxypropyl)dichroloacetamide, melted at 120.0–121.8°C. (corr.).

Analysis.—Calcd. for $C_{12}H_{13}Cl_4NO_2$: C, 41.77; H, 3.80; $Cl_{KOH}$, 20.55. Found: C, 42.00; H, 3.86; $Cl_{KOH}$, 20.52. $Cl_{KOH}$=dichloroacetyle chlorine.

N - (3,4-dichlorobenzyl)-N-(2-hydroxypropyl)dicholoroacetamide was found to have amebacidal activity, being effective against amebiasis (*Endamoeba criceti*) of hamsters.

EXAMPLE 12

N - (2 - chlorobenzyl)-N-(2 - hydroxyethyl)dichloroacetamide

A mixture of 15 g. of N-(2-chlorobenzylamino)ethanolamine, 80 cc. of 1 N sodium hydroxide and 100 cc. ethylene dichloride was cooled with stirring to below 0°C. A solution of 12 g. of dichloroacetyl chloride in 30 cc. of ethylene dichloride was added dropwise over a one hour period, keeping the temperature below 0°C. After stirring for two hours longer at room temperature, the layers were separated and the ethylene dichloride layer was washed successively with 1 N sodium hydroxide, water, 1 N hydrochloric acid and water. The solvent was dried and removed. After two recrystallizations from benzene-n-pentane and a third recrystallization from ether-n-pentane, the product, N-(2-chlorobenzyl)-N-(2-hydroxyethyl)dichloroacetamide, melted at 76.6–79.3°C. (corr.); yield 11.0 g.

Analysis.—Calcd. for $C_{11}H_{12}Cl_3NO_2$: C, 44.51; H, 4.07; $Cl_{KOH}$, 23.88. Found: C, 44.41; H, 4.32; $Cl_{KOH}$, 23.96.

N - (2-chlorobenzyl)-N-(2-hydroxyethyl)dichloroacetamide was found to have amebacidal activity, being effective against amebiasis (*Endamoeba criceti*) of hamsters.

EXAMPLE 13

N-(3,4-dichlorobenzyl)-N-(3-hydroxypropyl)dichloroacetamide

A mixture of 9.4 g. of 3-(3,4-dichlorobenzylamino)-propanol and 6.4 g. of methyl dichloroacetate was heated at 60–70° C. for six hours. After stirring the resulting mixture with 1 N hydrochloric acid, the product was collected; yield 12.5 g. After two recrystallizations from benzene-n-pentane and two recrystallizations from ethylene dichloride -n-pentane, the product N-(3,4-dichlorobenzyl) - N - (3 - hydroxypropyl)dichloroacetamide, melted at 91.9–97.5° C. (corr.); yield 7.5 g.

Analysis.—Calcd. for $C_{12}H_{13}Cl_4NO_2$: C, 41.76; H, 3.79; 41.10. Found: C, 41.70; H, 3.89; 41.44.

N-(3,4-dichlorobenzyl) - N - (3-hydroxypropyl)dichloroacetamide was found to have amebacidal activity, being effective against amebiasis (*Endamoeba criceti*) of hamsters.

EXAMPLE 14

N-(2,4-dichlorobenzyl)-N-(3-hydroxypropyl)dichloroacetamide

A mixture of 9.4 g. of 3-(2,4-dichlorobenzylamino)-propanol and 6.4 g. of methyl dichloroacetate was heated at 60° C. for four hours. After stirring the resulting mixture with 1 N hydrochloric acid, the insoluble material was taken up in chloroform, dried and the solvent removed; yield 8 g. After three recrystallizations from benzene-n-pentane, the product, N-(2,4-dichlorobenzyl)-N-(3-hydroxypropyl)dichloroacetamide, melted at 83.7–86.7° C. (corr.).

Analysis.—Calcd. for $C_{12}H_{13}Cl_4NO_2$: C, 41.76; H, 3.79; Cl, 41.10. Found: C, 41.60; H, 3.88; Cl, 41.23.

N - (2,4-dichlorobenzyl)-N-(3-hydroxypropyl)dichloroacetamide was found to have amebacidal activity, being effective against amebiasis (*Endamoeba criceti*) of hamsters.

EXAMPLE 15

N-(3,4-dichlorobenzyl)-N-(2-hydroxyethyl)dibromoacetamide

A mixture of 11.0 g. of 2-(3,4-dichlorobenzylamino)-ethanol and 14 g. of ethyl dibromoacetate was heated at 60° C. for three hours. After stirring the resulting mixture with 1 N hydrochloric acid, the insoluble material was taken up in chloroform, washed with water and dried. On removal of the solvent, the residue solidified. After two recrystallizations from ethylene dichloride-n-pentane, the product, N-(3,4-dichlorobenzyl)-N-(2-hydroxyethyl)dibromoacetamide, melted at 115.5–128.8° C. (corr.).

Analysis.—Calcd. for $C_{11}H_{11}Br_2Cl_2NO_2$: C, 31.46; H, 2.64; Br. 38.07. Found: C, 31.54; H, 2.41; Br. 38.39.

N - (3,4-dichlorobenzyl)-N-(2-hydroxyethyl)dibromoacetamide was found to have amebacidal activity, being effective against amebiasis (*Endamoeba criceti*) of hamsters.

EXAMPLE 16

N-(3,4-dimethoxybenzyl)-N-(2-hydroxyethyl) dichloroacetamide

A mixture of 10.5 g. of 2-(3,4-dimethoxybenzylamino)-ethanol and 8 g. of methyl dichloroacetate was heated at 60° C. for three hours. After stirring the resulting mixture with 1 N hydrochloric acid, the insoluble material was taken up in ethylene dichloride. The acid layer was then extracted once with ethylene dichloride. The ethylene dichloride extracts were combined, washed with water, dried and charcoaled. Removal of the solvent yielded a solid material. After two recrystallizations of this solid from ethylene dichloride-n-pentane, the product, N-(3,4-dimethoxybenzyl)-N-(2-hydroxyethyl)dichloroacetamide, melted at 116.6–117.7° C. (corr.).

*Analysis.*—Calcd. for $C_{13}H_{17}Cl_2NO_4$: C, 48.45; H, 5.32; $Cl_{KOH}$, 22.01. Found: C, 48.54; H, 5.16; $Cl_{KOH}$, 22.14.

N-(3,4-dimethoxybenzyl)-N-(2-hydroxyethyl)dichloroacetamide was found to have amebacidal activity, being effective against amebiasis (*Endamoeba criceti*) of hamsters.

I claim:

1. An N-(substituted-benzyl)-N-(lower hydroxyalkyl)-dihaloacetamide having the formula

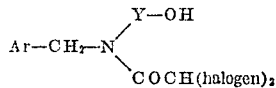

where Ar is a phenyl radical substituted by from one to three radicals selected from the class consisting of halogen, lower alkyl, lower alkoxy, lower alkylmercapto, lower alkylsulfonyl and nitro, and Y is a member of the group consisting of lower alpha,beta-alkylene radicals and lower alpha,gamma-alkylene radicals.

2. An N-(dihalobenzyl)-N-(lower betahydroxyalkyl)-dihaloacetamide having the formula

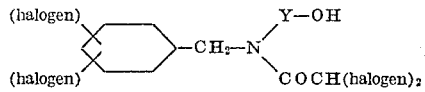

where Y is a lower alpha,beta-alkylene radical.

3. An N-(monoalkoxybenzyl)-N-(lower betahydroxyalkyl)dihaloacetamide having the formula

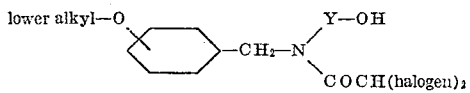

where Y is a lower alpha,beta-alkylene radical.

4. An N-(dihalobenzyl)-N-(2-hydroxyethyl)dihaloacetamide having the formula

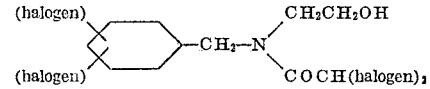

5. An N-(dihalobenzyl)-N-(2-hydroxyethyl)dichloroacetamide having the formula

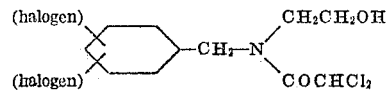

6. An N-(dihalobenzyl)-N-(2-hydroxyethyl)dibromoacetamide having the formula

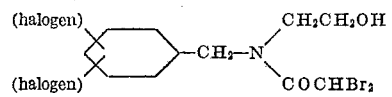

7. An N-(monoalkoxybenzyl)-N-(2-hydroxyethyl)dihaloacetamide having the formula

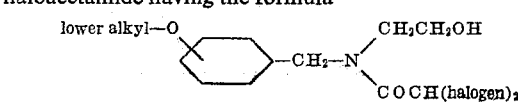

8. An N-(monoalkoxybenzyl)-N-(2-hydroxyethyl)dichloroacetamide having the formula

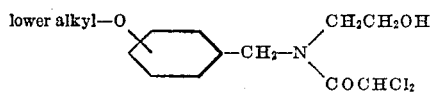

9. The process of preparing an N-(dihalobenzyl)-N-(lower beta-hydroxyalkyl)dihaloacetamide having the formula

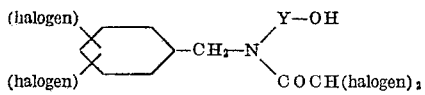

where Y is a lower alpha,beta-alkylene radical, which comprises reacting a lower beta-(dihalobenzylamino)alkanol with a lower alkyl dihaloacetate.

10. The process of preparing an N-(dihalobenzyl)-N-(lower beta-hydroxyalkyl)dihaloacetamide having the formula

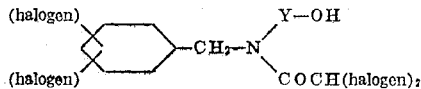

where Y is a lower alpha,beta-alkylene radical, which comprises reacting a lower beta-(dihalobenzylamino)alkanol with a dihaloacetyl halide.

11. The process of preparing an N-(monoalkoxybenzyl)-N-(lower beta-hydroxyalkyl)dihaloacetamide having the formula

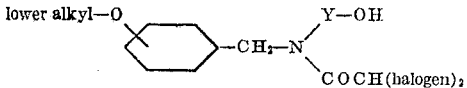

where Y is a lower alpha,beta-alkylene radical, which comprises reacting a lower beta-(monoalkoxybenzyl)alkanol with a dihaloacetyl halide.

12. The process of preparing an N-(dihalobenzyl)-N-(2-hydroxyethyl)dihaloacetamide having the formula

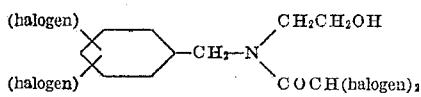

which comprises reacting a 2-(dihalobenzylamino)ethanol with a lower alkyl dihaloacetate.

13. The process of preparing an N-(dihalobenzyl)-N-(2-hydroxyethyl)dibromoacetamide having the formula

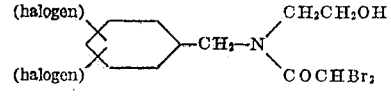

which comprises reacting a 2-(dihalobenzylamino)ethanol with a lower alkyl dibromoacetate.

14. The process of preparing an N-(dihalobenzyl)-N-(2-hydroxyethyl)dihaloacetamide having the formula

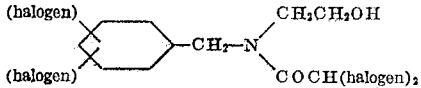

which comprises reacting a 2-(dihalobenzylamino)ethanol with a dihaloacetyl halide.

15. The process of preparing an N-(dihalobenzyl)-N-(2-hydroxyethyl)dichloroacetamide having the formula

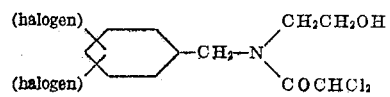

which comprises reacting a 2-(dihalobenzylamino)ethanol with dichloroacetyl chloride.

16. The process of preparing an N-(monoalkoxybenzyl)-N-(2-hydroxyethyl)dihaloacetamide having the formula

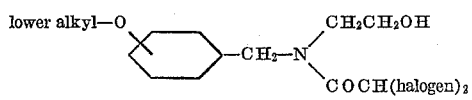

which comprises reacting a 2-(monoalkoxybenzylamino)ethanol with a dihaloacetyl halide.

17. The process of preparing an N-(monoalkoxybenzyl) - N - (2 - hydroxyethyl)dichloroacetamide having the formula

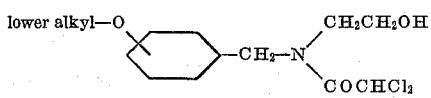

which comprises reacting a 2-(monoalkoxybenzylamino)ethanol with dichloroacetyl chloride.

18. N-(2,4-dichlorobenzyl)-N-(2-hydroxyethyl)dichloroacetamide.

19. N-(3,4-dichlorobenzyl)-N-(2-hydroxyethyl)dichloroacetamide.

20. N-(4-n-butoxybenzyl)-N-(2-hydroxyethyl)dichloroacetamide.

21. N-(2,4-dichlorobenzyl)-N-(2-hydroxyethyl)dibromoacetamide.

22. N-(3,4-dichlorobenzyl)-N-(2-hydroxyethyl)dibromoacetamide.

23. The process of preparing an N-(substituted-benzyl)-N-(lower hydroxyalkyl)dihaloacetamide having the formula

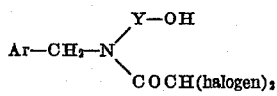

where Ar is a phenyl radical substituted by from one to three radicals selected from the class consisting of halogen, lower alkyl, lower alkoxy, lower alkylmercapto, lower alkylsulfonyl and nitro, and Y is a member of the group consisting of lower alpha,beta-alkylene radicals and lower alpha,gamma-alkylene radicals, which comprises reacting a (substituted-benzylamino)alkanol of the formula Ar—CH$_2$—NH—Y—OH with a dihaloacetylating agent selected from the group consisting of lower alkyl dihaloacetates and dihaloacetyl halides.

24. The process of preparing N-(2,4-dichlorobenzyl)-N-(2-hydroxyethyl)dibromoacetamide which comprises reacting 2-(2,4-dichlorobenzylamino)ethanol with ethyl dibromoacetate.

25. The process of preparing N-(3,4-dichlorobenzyl)-N-(2-hydroxyethyl)dibromoacetamide which comprises reacting 2-(3,4-dichlorobenzylamino)ethanol with ethyl dibromoacetate.

26. The process of preparing N-(2,4-dichlorobenzyl)-N-(2-hydroxyethyl)dichloroacetamide which comprises reacting 2-(2,4-dichlorobenzylamino)ethanol with dichloroacetyl chloride.

27. The process of preparing N-(3,4-dichlorobenzyl)-N-(2-hydroxyethyl)dichloroacetamide which comprises reacting 2-(3,4-dichlorobenzylamino)ethanol with dichloroacetyl chloride.

28. The process of preparing N-(4-n-butoxybenzyl)-N-(2-hydroxyethyl)dichloroacetamide which comprises reacting 2-(4-n-butoxybenzylamino)ethanol with dichloroacetyl chloride.

References Cited in the file of this patent
UNITED STATES PATENTS
2,569,288     Cassell et al. _____ Sept. 25, 1951

OTHER REFERENCES

Rebstock et al.: "J. A. C. S.," vol. 73, p. 3670.

Kushner et al.: "J. Org. Chem.," vol. 16 (1951), pp. 1283–8.

Mannich et al.: "Archiv. der Pharmazie," vol. 250, p. 546.